US010042372B2

(12) United States Patent
Baek et al.

(10) Patent No.: US 10,042,372 B2
(45) Date of Patent: Aug. 7, 2018

(54) DC-DC CONVERTER DEVICE AND SUB DC-DC CONVERTER OF PARALLEL STRUCTURE INCLUDED THEREIN

(71) Applicant: Chung-Ang University Industry-Academy Cooperation Foundation, Seoul (KR)

(72) Inventors: Dong Hyun Baek, Seoul (KR); Jeong-Yun Lee, Seoul (KR); Sun-Woo Yun, Seoul (KR); Youngjin Kim, Gyeonggi-do (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 0 days.

(21) Appl. No.: 15/052,648

(22) Filed: Feb. 24, 2016

(65) Prior Publication Data
US 2016/0170424 A1    Jun. 16, 2016

Related U.S. Application Data

(63) Continuation of application No. PCT/KR2015/003031, filed on Mar. 27, 2015.

(30) Foreign Application Priority Data

May 21, 2014  (KR) .................. 10-2014-0061019

(51) Int. Cl.
*H02M 3/06* (2006.01)
*G05F 1/56* (2006.01)
(Continued)

(52) U.S. Cl.
CPC ............... *G05F 1/56* (2013.01); *H02M 3/06* (2013.01); *G05F 1/563* (2013.01); *H02M 2001/0012* (2013.01); *H02M 2001/0045* (2013.01)

(58) Field of Classification Search
CPC ... G05F 1/10; G05F 1/267; G05F 1/46; G05F 1/561; G05F 1/567; G05F 1/569;
(Continued)

(56) References Cited

U.S. PATENT DOCUMENTS 5,414,614 A   5/1995  Fette et al.
6,738,271 B2  5/2004  Umeda
(Continued)

FOREIGN PATENT DOCUMENTS

JP    2007-174858 A    7/2007

OTHER PUBLICATIONS

Choi, B. et al., "Control Strategy for Multi-Module Parallel Converter System", IEEE, (1990) pp. 225-234.

*Primary Examiner* — Timothy J Dole
*Assistant Examiner* — Bryan R Perez
(74) *Attorney, Agent, or Firm* — Mintz Levin Cohn Ferris Glovsky and Popeo, P.C.; Kongsik Kim; Jhongwoo Jay Peck (57) ABSTRACT

A DC-DC converter device and a sub DC-DC converter unit with parallel structure included in the same are disclosed. The DC-DC converter device includes a main DC-DC converter unit configured to receive a (1-1)th reference voltage, a (1-2)th reference voltage and a (n−1)th output voltage, and output an nth first output current corresponding to an nth output voltage; and a sub DC-DC converter unit configured to receive a second reference voltage and the (n−1)th output voltage, and output an nth second output current corresponding to the nth output voltage. Here, an output current in accordance with the nth output voltage corresponds to sum of the nth first output current and the nth second output current.

4 Claims, 8 Drawing Sheets

(51) Int. Cl.
*G05F 1/563* (2006.01)
*H02M 1/00* (2006.01)

(58) Field of Classification Search
CPC ........ G05F 1/571; G05F 1/573; G05F 1/5735;
G05F 1/461; G05F 1/462; G05F 1/463;
G05F 1/465; G05F 1/466; G05F 1/467;
G05F 1/56; G05F 1/562; G05F 1/563;
G05F 1/565; G05F 1/575; G05F 1/577;
G05F 1/585; G05F 1/59; G05F 1/595;
G05F 1/607; G05F 1/61; G05F 1/613;
G05F 1/614; G05F 1/618; G05F 1/62;
G05F 1/66; G05F 1/08; G05F 1/153;
G05F 1/16; G05F 1/26; G05F 1/34; G05F
3/02; G05F 3/30; G05F 3/22; G05F
3/222; G05F 3/242; G05F 3/225; G05F
3/245; G05F 3/20; G05F 3/00; G05F
3/08; G05F 3/10; G05F 3/16; G05F 3/18;
G05F 3/185; G05F 3/227; G05F 3/247;
G05F 3/26; G05F 3/265; G05F 3/24;
G05F 3/262; H02M 2001/0009; H02M
2001/0012; H02M 2003/1557; H02M
3/156; H02M 3/158; H02M 3/1588;
H02M 3/155; H02M 3/1582; H02M
3/157; H02M 3/1563; H02M 3/06
USPC .................................................. 323/282–285
See application file for complete search history.

(56) References Cited

U.S. PATENT DOCUMENTS

| | | | |
|---|---|---|---|
| 6,930,535 B2 | 8/2005 | Kim | |
| 7,701,181 B2* | 4/2010 | Inoue | G05F 1/575 323/268 |
| 2011/0187339 A1* | 8/2011 | Trattler | H02M 3/156 323/283 |
| 2013/0162233 A1* | 6/2013 | Marty | H02M 3/158 323/274 |
| 2013/0321076 A1* | 12/2013 | Galbis | H03F 1/0216 330/127 |
| 2013/0335047 A1* | 12/2013 | Yamaguchi | G05F 1/468 323/282 |

* cited by examiner

DC-DC CONVERTER DEVICE AND SUB DC-DC CONVERTER OF PARALLEL STRUCTURE INCLUDED THEREIN

CROSS-REFERENCE TO RELATED APPLICATIONS

This is a continuation application of International Application No. PCT/KR2015/003031 filed on Mar. 27, 2015, which claims priority to Korean Application No. 10-2014-0061019 filed on May 21, 2014, which applications are incorporated herein by reference.

TECHNICAL FIELD

The present disclosure relates to a DC-DC converter device for controlling an output power using parallel structure of a linear regulator, quickening response velocity of the output power by solving high resolution problem of the output power and supplying stable dc voltage, and a sub DC-DC converter included in the same.

BACKGROUND ART

Conventional DC-DC converter device uses an analog control method and a digital control method to adjust an output voltage and increase power conversion efficiency. Specially, power consumption is low and the DC-DC converter device has rapid response velocity when the digital control method, and thus the DC-DC converter device has mainly used the digital control method lately.

The DC-DC converter device using the digital control method controls an output power using binary code, and so it obtains quantized output power. As a result, many control bits are required for increasing resolution of the output power, and so a system becomes complicated and response velocity of the output power of the DC-DC converter becomes noticeably slow when load resistance is suddenly changed. Additionally, if small control bits are used, the resolution of the output power becomes lower and so unstable voltage may be outputted.

SUMMARY

To solve substantially obviate one or more problems due to limitations and disadvantages of the background art, one embodiment of the invention provides a DC-DC converter device for controlling an output power using parallel structure of a linear regulator, quickening response velocity of the output power by solving high resolution problem of the output power and supplying stable dc voltage and a sub DC-DC converter unit included in the same.

Other embodiments of the invention may be easily thought by a person in the art through below embodiments.

One embodiment of the invention provides a DC-DC converter device comprising: a main DC-DC converter unit configured to receive a (1-1)th reference voltage, a (1-2)th reference voltage and a (n−1)th output voltage, and output an nth first output current corresponding to an nth output voltage; and a sub DC-DC converter unit configured to receive a second reference voltage and the (n−1)th output voltage, and output an nth second output current corresponding to the nth output voltage. Here, an output current in accordance with the nth output voltage corresponds to sum of the nth first output current and the nth second output current.

The sub DC-DC converter unit includes a sub DC-DC converter configured to output a voltage corresponding to difference between the (1-1)th reference voltage and the (1-2)th reference voltage; and a low drop output LDO regulator configured to receive the second reference voltage and the (n−1)th output voltage, and be controlled by the voltage corresponding to the difference, and wherein the LDO regulator outputs the nth second output current.

The second reference voltage is a voltage between the (1-1)th reference voltage and the (1-2)th reference voltage.

The second reference voltage is an average of the (1-1)th reference voltage and the (1-2) reference voltage.

The main DC-DC converter unit includes a first comparator configured to compare the (1-1)th reference voltage with the (n−1)th output voltage; a second comparator configured to compare the (1-2)th reference voltage with the (n−1)th output voltage; a controller configured to receive an output of the first comparator and an output of the second comparator and generate a control signal for controlling the nth first output current using the outputs of the comparators; and a main DC-DC converter configured to output the nth first output current based on the control signal.

Another embodiment of the invention provides a sub DC-DC converter unit connected in parallel to a main DC-DC converter unit for receiving a (1-1)th reference voltage, a (1-2)th reference voltage and a (n−1)th output voltage and outputting an nth first output current corresponding to an nth output voltage, the sub DC-DC converter unit comprising: a sub DC-DC converter configured to output a voltage corresponding to difference between the (1-1)th reference voltage and the (1-2)th reference voltage; and an LDO regulator configured to receive a second reference voltage and the (n−1)th output voltage and output an nth second output current according to the voltage corresponding to the difference. Here, an output current in accordance with the nth output voltage corresponds to sum of the nth first output current and the nth second output current.

A DC-DC converter device of the invention controls an output power using parallel structure of a linear regulator, quickens response velocity of the output power by solving high resolution problem of the output power and supplies stable dc voltage.

BRIEF DESCRIPTION OF DRAWINGS

Example embodiments of the present invention will become more apparent by describing in detail example embodiments of the present invention with reference to the accompanying drawings, in which.

DETAILED DESCRIPTION

The invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Hereinafter, embodiments of the invention will be described in detail with reference to accompanying drawings.

Figure 1:
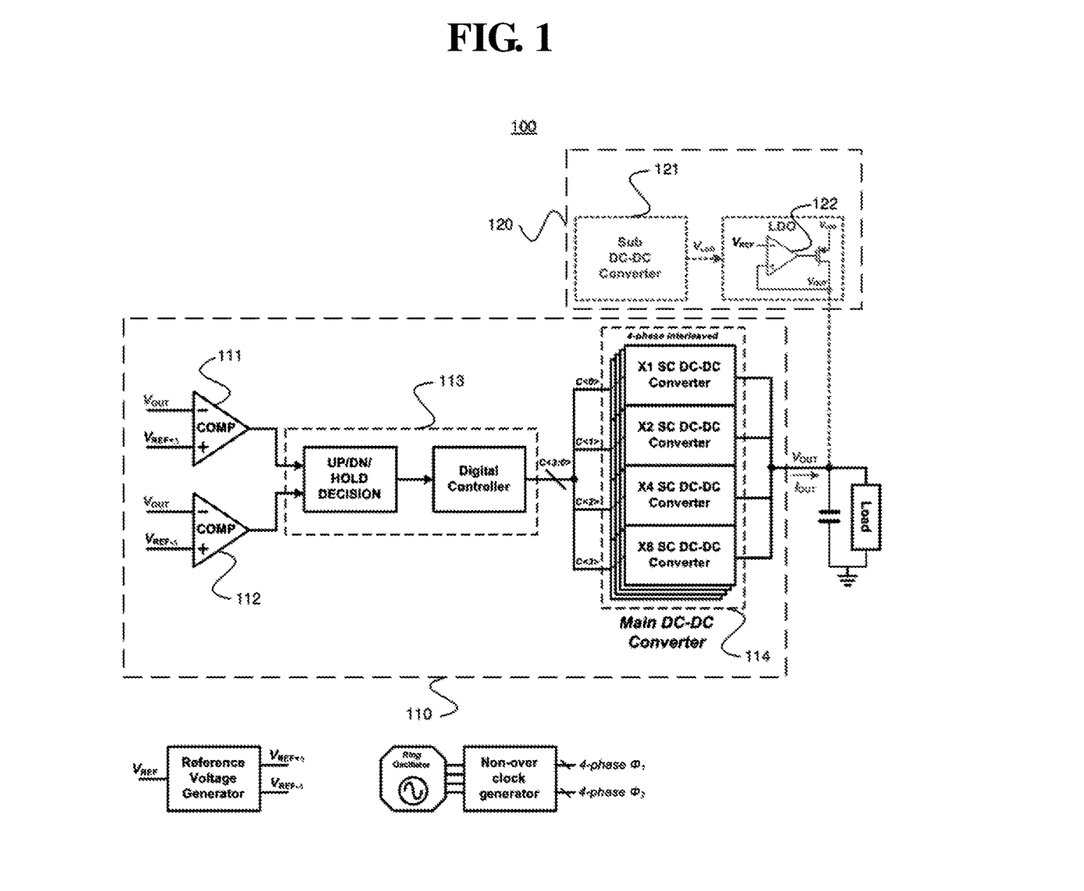
FIG. 1 is a view illustrating schematically a DC-DC converter device according to one embodiment of the invention.
Figure 2:
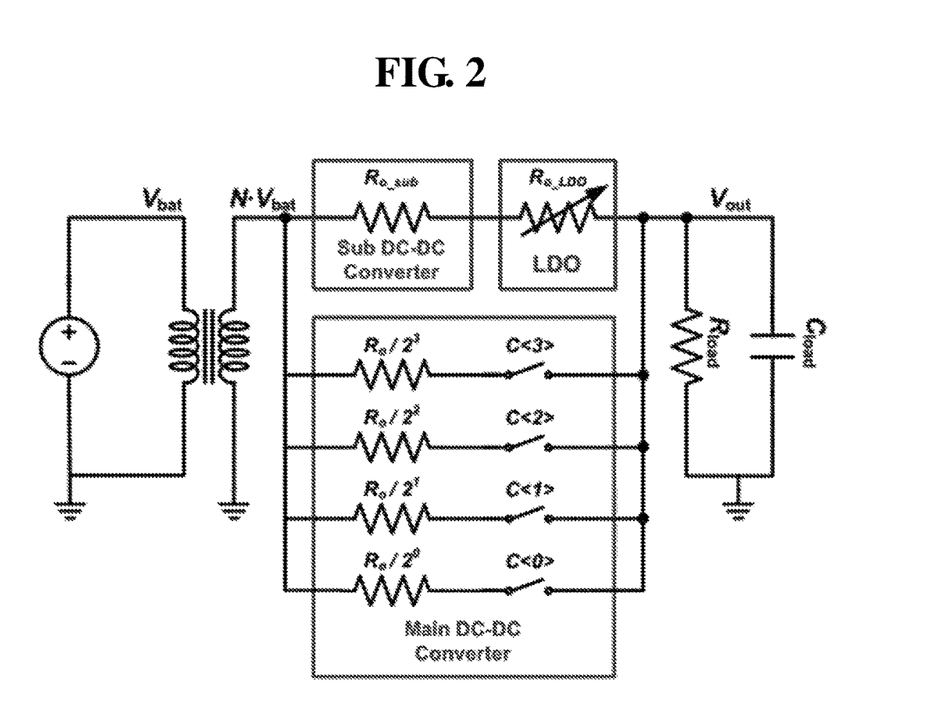
FIG. 2 is a view illustrating a simplified model of the DC-DC converter device in FIG. 1.

FIG. 1 is a view illustrating schematically a DC-DC converter device according to one embodiment of the invention, and FIG. 2 is a view illustrating a simplified model of the DC-DC converter device in FIG. 1.

In FIG. 1 and FIG. 2, a DC-DC converter device 100 of the present embodiment includes a main DC-DC converter unit 110 and a sub DC-DC converter unit 120.

The main DC-DC converter unit 110 has a circuit similar to a DC-DC converter unit using conventional switched capacitor, receives a (1-1)th reference voltage, a (1-2)th reference voltage and a (n−1)th first output voltage, and outputs an nth output voltage and an nth first output current corresponding to the nth output voltage. To perform this operation, the main DC-DC converter unit 110 includes a first comparator 111, a second comparator 112, a controller 113 having an up/down (UP/DN) decision unit and a digital controller and a main DC-DC converter 114. Hereinafter, the main DC-DC converter unit 110 will be schematically described below.

The first comparator 111 compares the (1-1)th reference voltage and the (n−1)th output voltage and outputs an output value in accordance with the comparing result. For example, the (1-1)th reference voltage may be a high reference voltage $V_{REF\_L}$. The second comparator 112 compares the (1-2)th reference voltage and the (n−1)th output voltage and outputs an output value according to the comparing result. For instance, the (1-2)th reference voltage may be a low reference voltage $V_{REF\_L}$.

The controller 113 generates a control signal using the output voltage of the first comparator 111 and the output voltage of the second comparator 112 so that an output voltage of the main DC-DC converter 114 corresponds to a reference voltage. That is, the controller 113 generates the control signal based on the comparing results of the comparators 111 and 112 so that the nth output voltage has the reference voltage corresponding to a voltage between the (1-1)th reference voltage $V_{REF\_H}$ and the (1-2)th reference voltage $V_{REF\_L}$.

Particularly, the up/down decision unit of the controller 113 generates a signal for controlling the output voltage based on the comparing results of the comparators 111 and 112.

That is, the up/down decision unit generates a down signal for downing the output voltage when the (n−1)th output voltage is higher than i) the (1-1)th reference voltage $V_{REF\_H}$ and the (1-2)th reference voltage $V_{REF\_L}$, generates an up signal for increasing the output voltage when the (n−1)th output voltage is smaller than ii) the (1-1)th reference voltage $V_{REF\_H}$ and the (1-2)th reference voltage $V_{REF\_L}$, and generates a lock signal for keeping the output voltage when iii) the (n−1)th output voltage exists between the (1-1)th reference voltage $V_{REF\_H}$ and the (1-2)th reference voltage $V_{REF\_L}$, based on the comparing results of the comparators 111 and 112.

Subsequently, the digital controller of the controller 113 generates the control signal using the generated up signal, the generated down signal and the generated lock signal so that the output voltage of the main DC-DC converter 114 corresponds to the reference voltage. For example, the control signal may be a digital signal with 3 bits (000 to 111).

Finally, the main DC-DC converter 114 outputs the nth output voltage and the nth first output current corresponding to the nth output voltage according to the control signal.

Figure 3:
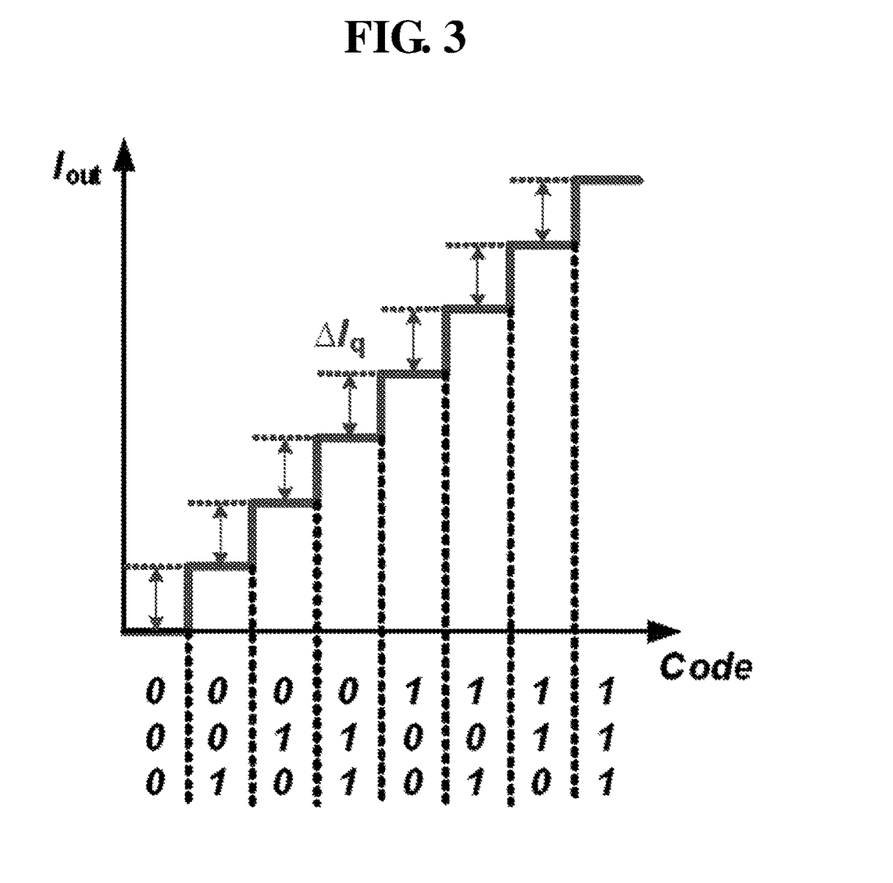
FIG. 3 is a view illustrating a graph showing a first output current of a main DC-DC converter unit of the DC-DC converter device according to one embodiment of the invention.

As a result, the main DC-DC converter unit 110 outputs the first output current as shown in FIG. 3.

The sub DC-DC converter unit 120 receives the second reference voltage and the (n−1)th output voltage, and outputs an nth second output current corresponding to the nth output voltage. The sub DC-DC converter unit 120 includes a sub DC-DC converter 121 and a low drop output LDO regulator 122. Hereinafter, the sub DC-DC converter unit 120 will be described schematically.

The sub DC-DC converter 121 outputs a voltage corresponding to difference between the (1-1)th reference voltage $V_{REF\_H}$ and the (1-2)th reference voltage $V_{REF\_L}$. For example, the sub DC-DC converter 121 outputs 0.1V (1.6V− 1.5V) in the event that the (1-1)th reference voltage $V_{REF\_H}$ is 1.5V and the (1-2)th reference voltage $V_{REF\_L}$ is 1.6V.

The LDO regulator 122 receives the second reference voltage and the (n−1)th output voltage and outputs an nth second output current according to the voltage outputted from the sub DC-DC converter 121. In one embodiment, the second reference voltage may be a voltage between the (1-1)th reference voltage $V_{REF\_H}$ and the (1-2)th reference voltage $V_{REF\_L}$ (for example, average of the (1-1)th reference voltage $V_{REF\_H}$ and the (1-2)th reference voltage $V_{REF\_L}$).

Particularly, the LDO regulator 122 is a regulator using the feature that resistance is changed according to a voltage of a semiconductor, includes a comparator and an FET, and is stabilized through a feedback loop. That is, the LDO regulator 122 is a circuit for changing continuously a variable resistance (FET) to keep constantly the output voltage of the DC-DC converter device 100.

In other words, the LDO regulator 122 compares the output voltage of the DC-DC converter device 100 and the second reference voltage $V_{REF}$ and outputs the nth second output current by controlling current flowing through the FET according to the comparing result, i.e. changing the variable resistance.

Figure 4:
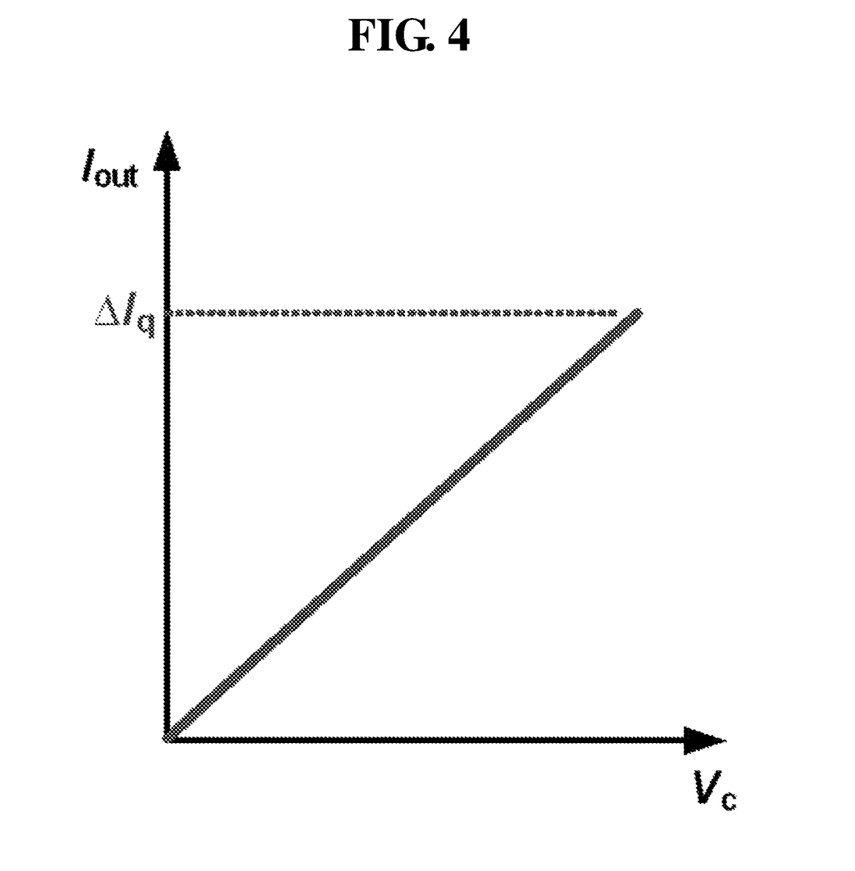
FIG. 4 is a view illustrating a graph showing a second output current of a sub DC-DC converter unit of the DC-DC converter device according to one embodiment of the invention.

As a result, the sub DC-DC converter unit 120 outputs the second output current as shown in FIG. 4. Here, the second output current is adjusted depending on an output value of the comparator of the LDO regulator 122.

Figure 5:
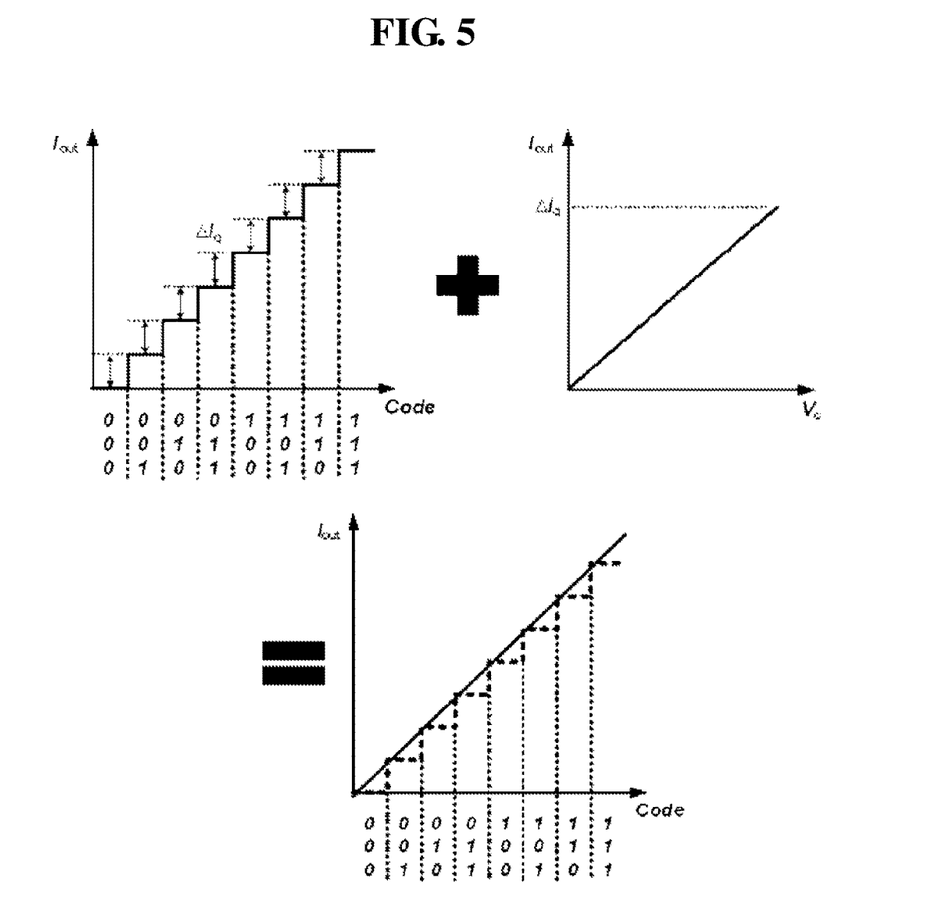
FIG. 5 is a view illustrating a graph showing total output current of a DC-DC converter device according to one embodiment of the invention.

Briefly, in one embodiment of the invention, it is verified that an output current corresponding to the nth output voltage corresponds to sum of the nth first output current and the nth second output current forms (referring to FIG. 5).

Accordingly, the conventional DC-DC converter device has low resolution of the output power if it uses a few of control bit, but the DC-DC converter device 100 of the invention may enhance resolution of the output power using the sub DC-DC converter unit 120 though it uses a few of control bit.

That is, if 1 bit corresponds to 1 mA, e.g. "001" corresponds to 1 mA and "010" corresponds to 2 mA in FIG. 3 and FIG. 5, the resolution of the conventional DC-DC converter device is 1 mA as shown in FIG. 3, and the DC-DC converter device 100 of the invention may output also the output current of 0.5 mA by using the sub DC-DC converter unit 120 as shown in FIG. 5, thereby increasing the resolution of the output power.

Figure 6:
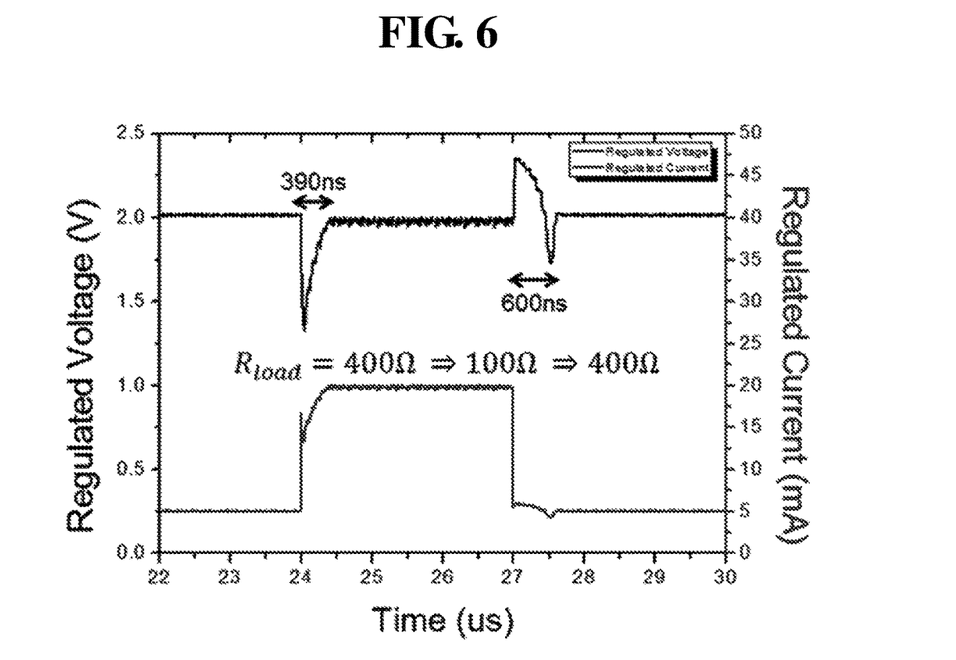
FIG. 6 (present invention), FIG. 7A (prior art) and FIG. 7B (present invention) describe effect of the DC-DC converter device according to an embodiment of the invention.
Figure 7A:
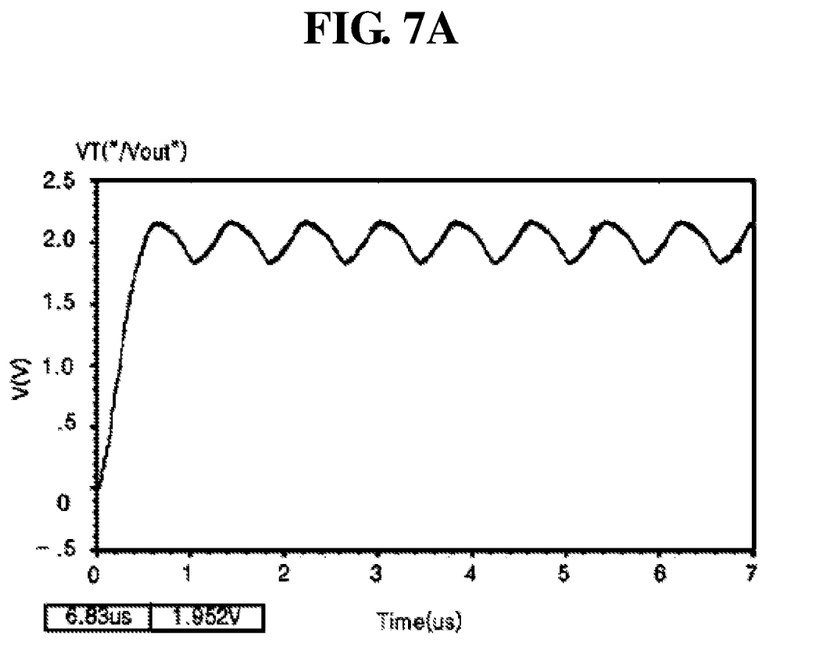
Figure 7B:
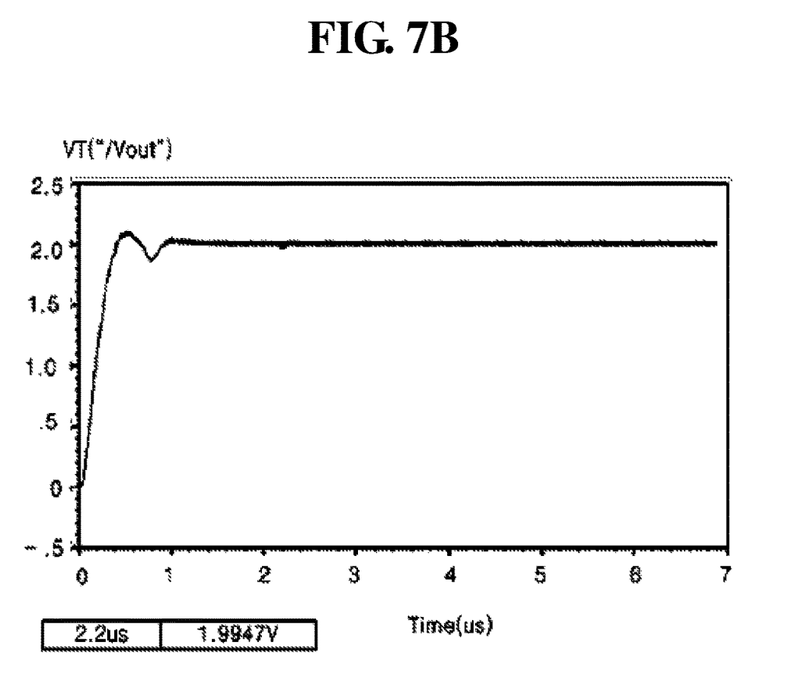

Additionally, the system is simplified, the response velocity of the output voltage becomes rapider when load resistance is suddenly changed, and stable voltage is outputted (FIGS. 6, 7A and 7B).

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

The invention claimed is:

1. A digital DC-DC converter device comprising:
a main DC-DC converter unit configured to receive a high reference voltage (VREF_H) that is higher than a reference voltage (VREF), a low reference voltage (VREF_L) that is lower than the VREF, and a time sequence n−1 ((n−1)th) output voltage that is a voltage output from the main DC-DC converter unit just prior to a time sequence n (nth) output voltage is output, and output an nth first output current; and
a sub DC-DC converter unit configured to receive the VREF and the (n−1)th output voltage, and output an nth second output current, wherein the nth first output current is quantized current, the nth second output current linear current, an output current in accordance with the nth output voltage corresponds to a sum of the nth first output current and the nth second output current, and the sub DC-DC converter unit includes a sub DC-DC converter configured to output a voltage corresponding to a difference voltage between the VREF_H and the VREF_L, and a Low Drop Output (LDO) regulator including a comparator and an FET, wherein, the comparator outputs a comparison result of the VREF and the (n−1)th output voltage, and a gate electrode of the FET is inputted the comparison result of the comparator, a source electrode of the FET is inputted the voltage corresponding to the difference voltage, and a drain electrode of the FET outputs the nth second output current.

2. The DC-DC converter device of claim 1, wherein the $V_{REF}$ is an average of the $V_{REF\_H}$ and the $V_{REF\_L}$.

3. The DC-DC converter device of claim 1, wherein the main DC-DC converter unit includes:
a first comparator configured to compare the $V_{REF\_H}$ with the (n−1)th output voltage;
a second comparator configured to compare the $V_{REF\_L}$ with the (n−1)th output voltage;
a controller configured to receive an output of the first comparator and an output of the second comparator and generate a control signal for controlling the nth first output current using the output of the first comparator and the output of the second comparator; and
a main DC-DC converter configured to output the nth first output current based on the control signal.

4. A sub DC-DC converter unit included in a digital DC-DC converter, and connected in parallel to a main DC-DC converter unit for receiving a high reference voltage (VREF_H) that is higher than a reference voltage (VREF), a low reference voltage (VREF_L) that is lower than the VREF, and a time sequence n−1 ((n−1)th) output voltage that is a voltage output from the main DC-DC converter unit just prior to a time sequence n (nth) output voltage is output, and outputting an nth first output current, the sub DC-DC converter unit comprising: a sub DC-DC converter configured to output a voltage corresponding to a difference voltage between the VREF_H and the VREF_L; a Low Drop Output (LDO) regulator including a comparator and an FET, wherein, the comparator outputs a comparison result of the VREF and the (n−1)th output voltage, wherein the VREF is a voltage between the VREF_H and the VREF_L, and a gate electrode of the FET is inputted the comparison result of the comparator, a source electrode of the FET is inputted the voltage corresponding to the difference voltage, and a drain electrode of the FET outputs an nth second output current, wherein the nth first output current is quantized current, the nth second output current linear current, and an output current in accordance with the nth output voltage corresponds to a sum of the nth first output current and the nth second output current.

* * * * *